Dec. 18, 1928.

H. BÉNIT 1,695,945

SPRING BELT STRETCHER

Filed July 19, 1926

Inventor
Henri Bénit
William Clinton
By     Attorney

Patented Dec. 18, 1928.

1,695,945

UNITED STATES PATENT OFFICE.

HENRI BÉNIT, OF PARIS, FRANCE, ASSIGNOR TO COMPAGNIE GENERALE D'ELECTRICITE, OF PARIS, FRANCE.

SPRING-BELT STRETCHER.

Application filed July 19, 1926, Serial No. 123,533, and in France July 25, 1925.

Dynamos employed for lighting railway carriages are generally suspended from brackets fixed either to the underframe or to the bogies of the carriages.

These dynamos are driven by belts and pulleys, the driving pulleys being fixed on the axles of the carriages. In order to stretch the belt in such a way as to transmit power to the dynamo, the latter can either be inclined through a certain angle with reference to the vertical plane passing through its axis of suspension, the weight of the dynamo being thus utilized to produce tension, or an adjustable or non-adjustable spring stretching device can be employed which acts on the dynamo in such a way as to produce tension in the belt. A combination of the two methods can also be employed.

The object of the present invention is an adjustable spring belt stretcher, more particularly applicable to railway carriage lighting dynamos. The characteristics of this stretching device are its simplicity and its flexibility.

An embodiment of the invention is represented, by way of example only, in the accompanying drawing wherein.

On all the figures the same parts are designated by the same reference numbers: 1 represents the dynamo, 2 represents the dynamo pulley, 3 the driving pulley fixed on the axle, 4 the belt, 5 the carriage wheel, 6 the bracket from which the dynamo is suspended, 7 the dynamo suspension lugs.

Figure 1:
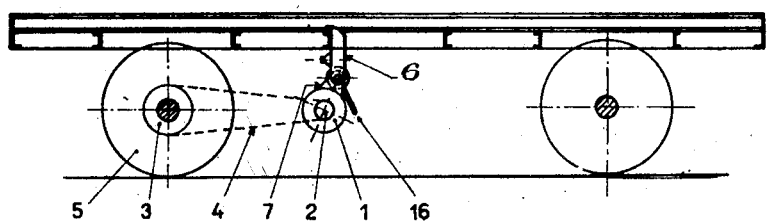
Fig. 1 represents a dynamo, fitted with its stretching device, fixed to the underframe of a carriage.
Figures 2, 3:
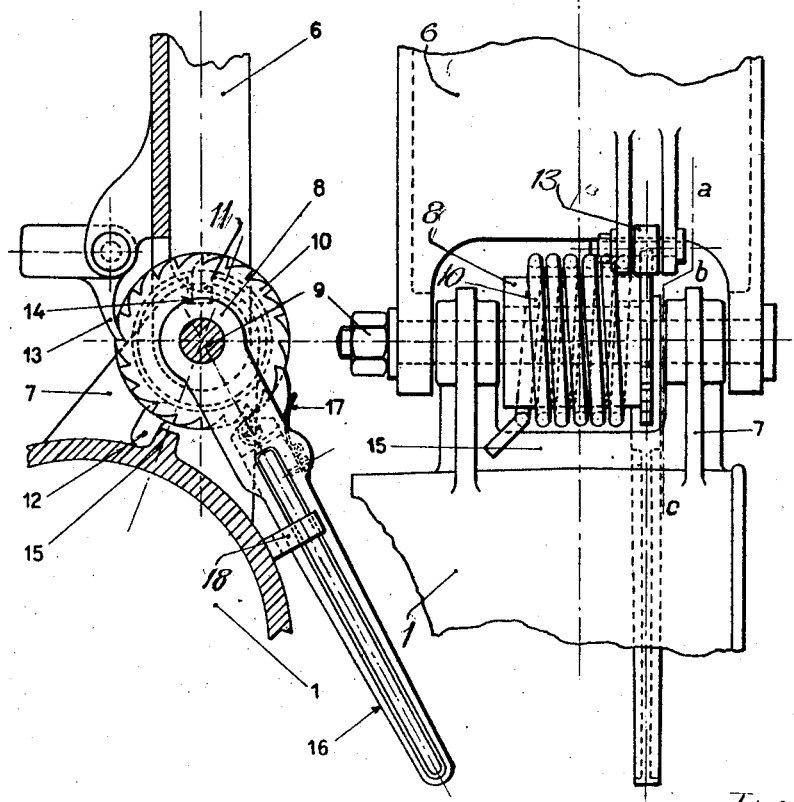
Fig. 2 is a view of the stretching device on a larger scale.
Fig. 3 is a cross section along line $a, b, c,$ of Fig. 2.

The object of the stretching device is to produce tension in the belt 4. This stretching device includes a ratchet wheel 8 loosely mounted on the dynamo suspension pin 9, a helical spring 10 whose ends are bent along a diameter in such a way that the end 11 points towards the centre of the coils and the end 12 in the opposite direction.

The ratchet wheel 8 is prevented from moving by means of a hinged pawl 13 suspended from the suspension bracket 6 of the dynamo. The lever 16, mounted on the pin 9, is provided with a pawl which engages with the teeth of the ratchet wheel. A plate spring 17 holds the pawl or ratchet in place. As shown in the figure, the dynamo 1 is inclined and the component of its weight serves to stretch the belt partially. In order to obtain full tension, it suffices to turn the wheel 8 in the direction of the arrow by means of the lever 16 and the teeth of the ratchet wheel. The end 11 of the spring, which is held in the groove 14 of the ratchet wheel, is thus drawn round with the latter, while the end 12, which bears on the boss 15 on the dynamo, increases the tension of the belt.

The spring jaws 18 fixed to the casing of the dynamo hold the lever 16 when not in use.

Having thus fully described the invention, what I claim as new and desire to protect by Letters Patent is:

1. A tension regulating device for driving belts comprising a support bracket, a pulley supporting member pivotally connected with the bracket, a ratchet rotatably mounted on the pivot including a cylindrical body and a toothed wheel fixed on one end of the body, a tension spring wound about the body having one end secured thereto and the opposite end attached to the pulley supporting member, means for securing the ratchet wheel against rotation in one direction, and a lever operatively associated with the pivot and ratchet wheel adapted to permit rotation of the ratchet wheel in opposite direction to increase the tension of the spring.

2. A tension regulating device for driving belts comprising a support bracket, a pivot pin mounted in the bracket, a pulley supporting member pivotally connected with the pin, a ratchet rotatably mounted on the said pin including a cylindrical body and a toothed wheel fixed on one end of the body, a helical spring wound about the body having one end secured thereto and the opposite end attached to the pulley supporting member so as to exert a tension on the drive belt of the pulley, means for securing the ratchet wheel against rotation against the tension of the spring, and a lever pivotally connected with the pivot pin operable to engage the ratchet wheel for rotation of the ratchet wheel to increase the tension of the spring on the pulley member.

In witness whereof I have hereunto set my hand.

HENRI BÉNIT.